United States Patent [19]
Blaszczak

[11] 3,839,173

[45] Oct. 1, 1974

[54] POLYMERIZATION PRODUCT OF FORMALDEHYDE AND CARBOHYDRATES

[76] Inventor: Joseph W. Blaszczak, 5702 Woodside Ave., Woodside, N.Y. 11377

[22] Filed: Mar. 30, 1971

[21] Appl. No.: 129,617

Related U.S. Application Data

[63] Continuation-in-part of Ser. Nos. 256,539, Feb. 6, 1963, abandoned, and Ser. No. 458,759, May 25, 1965, Pat. No. 3,479,335, and Ser. No. 877,524, Nov. 17, 1969, abandoned.

[52] U.S. Cl.......... 204/160.1, 204/159.21, 260/9 R, 260/17.3 S, 260/209 R, 260/211.3, 424/180;9
[51] Int. Cl. ..................... C07d 57/32, C08h 25/00
[58] Field of Search............ 260/211.3, 209, 209 R, 260/9, 17.3; 204/159.12, 160.1, 159.21

[56] References Cited
UNITED STATES PATENTS

| | | | |
|---|---|---|---|
| 2,587,533 | 2/1952 | Schoen et al. | 260/211.3 |
| 2,775,621 | 12/1956 | MacLean et al. | 260/209 R |
| 2,956,963 | 10/1960 | Baird | 260/209 R |
| 3,479,335 | 11/1969 | Blaszczak | 260/211.3 |

*Primary Examiner*—Johnnie R. Brown
*Attorney, Agent, or Firm*—Erich M. H. Radde

[57] ABSTRACT

Pharmaceutical preparations containing reaction products of riboflavin and/or ribose with formaldehyde or compounds yielding formaldehyde such as paraformaldehyde are useful therapeutic agents for the treatment of disorders of the cell metabolism and for normalizing improperly functioning cells such as, degenerative diseases due to radiation and to malfunction of the nervous system.

4 Claims, No Drawings

POLYMERIZATION PRODUCT OF FORMALDEHYDE AND CARBOHYDRATES

CROSS-REFERENCES TO RELATED APPLICATIONS

The present application is a continuation-in-part of application Ser. No. 256,539, filed Feb. 6, 1963, entitled REACTION PRODUCTS OF VITAMINS AND PROCESS OF MAKING AND USING SAME, abandoned in favor of application Ser. No. 458,759, filed May 25, 1965, now U.S. Pat. No. 3,479,335, issued Nov. 18, 1969, entitled REACTION PRODUCTS OF RIBOFLAVIN WITH FORMALDEHYDE AND PROCESS FOR PREPARING SAME, and of application Ser. No. 877,524, filed Nov. 17, 1969, entitled PHARMACEUTICAL COMPOSITIONS AND A METHOD FOR THE TREATMENT OF DISORDERS OF THE CELL METABOLISM, now abandoned.

BACKGROUND OF THE INVENTION

1. Field of the Invention

The present invention relates to pharmaceutical compositions containing, as active agents, reaction products of riboflavin and/or ribose with formaldehyde or formaldehyde yielding compounds, which reaction products are able to restore pathologically affected cells to the structure and function of normal cells, and to a method for the treatment of disorders of the cell metabolism and for normalizing improperly functioning cells.

2. Description of the Prior Art

In order to understand the theory of the invention, the following may be considered. Present evidence suggests that cancer may be related to a disarrangement of the molecules with respect to their cell chemistry and hence to a disarrangement in cell structure. The synthesis of the proteins defining the cell is associated with or controlled by deoxyribonucleic acid (DNA) and ribonucleic acid (RNA) which act as the molecular matrixes on which the cellular proteins are patterned. This metabolism, growth, and proliferation of cells may be altered by irritants or may be influenced from outside the cell or by products of the cell's metabolism, i.e., metabolites. The process of molecular disarrangement, caused by such irritants, results in a mutation of the DNA pattern for ribonucleoprotein genes and hence a mutation of the cell structure. The onset of the malignant process originates in the changes in the ribonucleoproteins of thus irritated nerves. Once altered, the metabolism continues to form new molecules exactly according to the damaged RNA pattern. These new molecules build up new proteins and different, defective, or malignant cells which continue to reproduce. Various chemical, physical, and pathogenic factors can cause this mutation of the genes and hence of the cells. The most characteristic causes of this mutation are: Inactivation of the precursors of ribonucleoprotein synthesis, i.e., of the formic acid esters or formates, and excess of phosphates in the ribonucleoproteins are responsible for the functional dynamism of malignant cells.

Different ribonucleoproteins are composed of different genes. The exogenous irritants affect the genes and change the chemical composition of the cellular proteins through the control exercised by the DNA and RNA patterns. Carcinogenic metabolites may thus be formed, which may diffuse from cell to cell like a virus thus altering the neighboring cells and organs. Or they may originate and multiply through the proliferation of the cells at one point and thus produce a primary malignant focus as, for instance, in melanoma. The altered genes of ribonucleoproteins may also cause an excessive production of enzymes, such as the polynucleotide phosphorylase enzymes, which may promote malignant growth inside the cell. Cancer growth may involve the formation of one or many specific types of such malfunctions of the genes, which, in turn, determine the type and rate of development of malignancy.

Efforts have been made to correct the malignant ribonucleoprotein metabolism which may produce a carcinogenic metabolite that causes irritation and change of the DNA pattern for future generations of cells. Thus, this malignant protein metabolism creates a new system of proliferating the ribonucleoproteins which are altered or malignant, and which duplicate their deformed molecular structure.

It is believed that a failure in any single step involved in the incorrect synthesis of ribonucleoproteins will result in the failure of the cancer to grow.

It has now been found that a correlation exists between this control of malignant growth and the metabolism of specific chemical compounds administered. These chemical compounds have methylene groups which are immediately available for their growth inhibiting function.

SUMMARY OF THE INVENTION

It is one object of the present invention to provide valuable and highly effective pharmaceutical compositions which have a normalizing effect on abnormal cell metabolism, growth, and proliferation.

Another object of the present invention is to provide an effective method of treating disturbances and disorders of the cell metabolism with the purpose of restoring the normal structure and function to improperly functioning cells.

Still another object of the present invention is to provide a novel process of making reaction products of riboflavin and/or ribose with formaldehyde or formaldehyde yielding compounds which reaction products are useful as active agents in the pharmaceutical compositions according to the present invention.

Other objects of the present invention and advantageous features thereof will become apparent as the description proceeds.

In principle, the valuable and highly effective pharmaceutical compositions according to the present invention which, on administration, are capable of restoring the normal metabolism to cells, when disturbed by carcinogenic agents, are characterized by containing reaction products of riboflavin and/or ribose with formaldehyde or compounds which, under the reaction conditions, yield formaldehyde.

Compounds according to the present invention are obtained by the interaction of formaldehyde or products obtained from the polymerization of formaldehyde with metal salts and/or with riboflavin and/or ribose or products obtained by the polymerization of riboflavin or ribose in the presence of water and air which participate in the reaction.

Aqueous formaldehyde condenses or polymerizes in at least two ways:

a. Spontaneously to polyoxymethylene of the linear formula -CH$_2$-O-CH$_2$-O-CH$_2$-O-CH$_2$-O-CH$_2$-O , or b. under the influence of activators with the formation of polyhydroxy aldehydes, i.e., so-called formoses of the formula

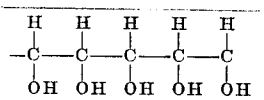

The reaction products of riboflavin and/or ribose with formaldehyde or formaldehyde yielding compounds are preferably prepared as described in U.S. Pat No. 3,479,335, of which the present application is a continuation-in-part. This patent is included by reference in the present application.

Reaction products as they are obtained by Schoen et al. in U.S. Pat No. 2,587,533 may also be employed.

According to a novel and advantageous process such reaction products of riboflavin and/or ribose with formaldehyde or formaldehyde yielding compounds are obtained by carrying out the reaction at a final reaction temperature equal to or higher than the melting point of the reaction mixture.

The new compounds according to the present invention are thus obtained by a preferred procedure involving the interaction of products resulting from the process of polymerization both of formaldehyde and ribityl moiety of riboflavin and/or ribose in the presence of water and air.

The ribityl moiety

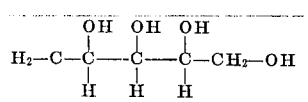

and d-ribose

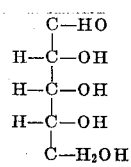

polymerize and produce at least six different products by polymerization reaction according to the process of producing the reaction products.

The reaction processes of formaldehyde involve both polycondensation and polymerization. An aqueous solution of paraformaldehyde is an equilibrium mixture of formaldehyde monohydrate, i.e., methylene glycol -HO-CH$_2$OH, series of polymeric hydrates or polyoxymethylene glycols HO-CH$_2$O—CH$_2$-O—$_n$H which results from the chemical combination with water by participation of the carbon dioxide of the air and oxygen and formation of hydroxyaldehydes, i.e., so-called formoses results from such a combination. The formation of these compounds depends upon the concentration of formaldehyde in water and upon the reaction temperature. At a high temperature and a low formaldehyde concentration monohydrates are formed; at a low temperature and a high formaldehyde concentration polymeric hydrates are formed. These hydrates have a high degree of stability and are extremely reactive. The process of formation of hydrates may be presented by the following reaction equation:

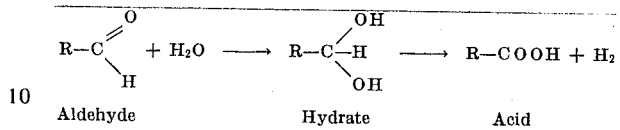

Aldehyde   Hydrate   Acid

Efforts have been made to produce a series of sugars from the products obtained by the condensation reaction of formaldehyde. Polymerization and ultraviolet irradiation are preferably required to obtain maximum amounts of such compounds.

Polymerization results in the formation of polymethylene derivatives and resinous products on reaction with sugar or sugar-like substances such as pentose or ribityl groups, which are linked by methylene groups. The reactions involve polyoxymethylenes, reversible polymers which, on heating in boiling water, form carbohydrate groups, and polyoxyaldehydes, irreversible polymers which form different classes of carbohydrates. Polymerization involves dissociated molecules and ions which combine with sugars or sugar-like substances, forming stable methylene ethers or formals. The optimum polymerization rate takes place at a temperature close to 4° C. and 100° C. The pH of 2.6 of the reaction medium causes irreversible polymerization with formation of stable products on cooling. With an increase in temperature of the reaction medium the pH decreases.

Exposure of formaldehyde to ultraviolet irradiation stimulates electrons, activates the reaction with neighboring molecules and finally decomposes it to carbon dioxide, methane, carbon oxide, and hydrogen at a temperature over 100° C. In the presence of water decomposing formaldehyde yields secondary products such as sugars and hydroxy aldehydes. Different compounds are formed at different temperatures of the reaction medium. Addition of inorganic salts activates the polymerization of formaldehyde which loses a hydrogen atom to be combined directly with metal thus causing condensation of formaldehyde to hydroxyaldehyde. These metallic ions form formates of which the carbon atom plays an important role in the formation of purine and pyrimidine in the biosynthesis of nucleic acids. It is also utilized in amino acid metabolism. It regenerates also the bases of nucleic acids.

Carbohydrates produced by polycondensation of simple methylol derivatives and by polymerization of double bonded methylene compounds may be fused together to form a series of sugars of different classes. They may also be fused with other carbohydrates such as ribityl groups or ribose. An example of a formula of a sugar may be postulated as follows:

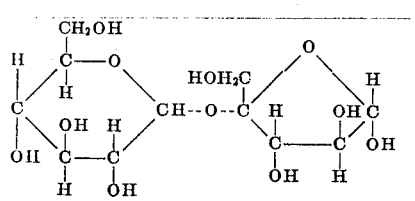

The activity of such compounds in protein and nucleic acid biosynthesis depends on a number of functional groups, $-CH_2-$ and $-CH_2OH-$ methylenes. Seven different compounds of complex structure have been isolated by chromatographic analysis of the reaction products. The percentage of weight of these seven fractional products of Example 2 are as follows:

| Number of the Fraction: | 1 | 2 | 3 | 4 | 5 | 6 | 7 |
|---|---|---|---|---|---|---|---|
| Weight in %: | 8.5 | 18.5 | 17.3 | 16.7 | 13.6 | 11 | 14.4 = 100% |
| Content of Riboflavin: | 8.2 | 12.1 | 23 | 32.5 | 9.7 | 13. | 1.5 = 100% |

The biological activity depends upon the content of pentoses in the fractional products. The tests performed with these separate products show that they are all biologically active at the same weight of riboflavon content. Thus it is necessary to adjust the weight of a fractional product to optimum dosage.

Studies regarding the activity of the reaction products have been performed upon different enzymatic systems. The results are summarized as follows:

a. The reaction product of example 2 inhibits the the enzyme polynucleotide phosphorylase which is responsible for the biosynthesis of nucleic acids. 0.2 mg. of the reaction product inhibits 100% of the enzyme within 15 minutes in a medium composed of:

| | | |
|---|---|---|
| ADP | 4.02 | mcg. |
| 32 PO$_4$ | 4 | mcg. SA |
| Buffer Tris, pH 8.15 | 100 | mcg. |
| EDTA | 2 | mcg. |
| UgCl$_2$ | 5 | mcg. |
| Polynucleotide Phosphorylase gel | 120 | mcg. protein |

Incubation at 30° C. The inhibition is non-competitive.

b. The oxidation-reduction of dehydrogenase enzymes such as, for instance, alcohol dehydrogenases and lactate dehydrogenase does not result in any biological and chemical changes when treated with the reaction product.
c. The reaction products inhibit the activity of the enzyme alkaline phosphatase and the inhibition is proportional to their content of riboflavin and ribose.
d. The reaction products of U.S. Pat. No. 2,587,533 of Schoen et al. exerts negligble activity upon the enzyme alkaline phosphatase.
e. The reaction product of Example 2 inhibits the activity upon the enzyme acid phosphatase and this activity is inversely proportional to the content of riboflavin, but is directly proportional to the content of pentoses produced from formaldehyde.

These data have been obtained from the analysis of seven different substances of the reaction products by absorption chromatography.

Compositions containing the new compounds are preferably administered orally. They are highly stable even on prolonged storage, substantially non-toxic, and are well tolerated without producing any side-effects in the therapeutic doses given. After oral administration the reaction products enter the duodenum where they are subjected to the action of the enzyme ribonuclease, a component of the pancreatic secretion. In the intestines the reaction products combine with alkaline phosphatase. Within 15 minutes the reaction products are in the blood stream and reach the leucocytes, liver, spleen, and kidney where they are again subjected to the activity of ribonucleases present in these organs. As a result of this initial metabolic reaction, the disintegrated reaction products reach the cytoplasm and ribosomes of the pathologically affected cells where they act through the agency of enzymes as precursors for ribonucleoprotein synthesis. The ribosomes conduct protein synthesis according to the material entering the cytoplasm. They coordinate also the translation of the genetic information in the sequence of nucleotide sugar base in the messenger ribonucleic acid transcribed from the genes to the sequence of amino acids in each manufactured protein. In the different cell lines different selection of genes are copied giving rise to different messenger RNA molecules. Thus, ribosomes may repair the distorted structure of DNA, produce a new messenger RNA, initiate a new pathway for the synthesis of proteins and proliferation of new cells.

DESCRIPTION OF THE PREFERRED EMBODIMENTS

In addition to the reaction products obtained as described in U.S. Pat. Nos. 3,479,335 and 2,587,533, the following examples are given to illustrate the novel process of producing the reaction products of riboflavin and/or ribose with formaldehyde or formaldehyde yielding compounds without, however, limiting the same hereto.

EXAMPLE 1

100 cc. of a formaldehyde solution containing not less than 37 percent, by weight, of formaldehyde with some ethanol or methanol are mixed with 50 cc. of water. 5 g. of finely divided riboflavin are suspended in said 150 cc. of aqueous formaldehyde solution at room temperature of about 20° C. Powdered potassium carbonate is then dissolved in the reaction mixture until its pH is about 9.0. The suspension is kept at room temperature for 3 days until all the riboflavin has dissolved. Acetic acid is then added to bring the pH to 5.0. The solution is then heated under a fume hood in an open receptacle on an electric heating plate until the odor of formaldehyde has almost disappeared. During this step, water is occasionally added to maintain a volume of 150 cc. The solution is then evaporated to dryness on a steam bath until a dark, brown-red residue is obtained. This residue is treated with consecutive portions of anhydrous ethanol at 50°–70° C. until the residue becomes crystalline and solid. The residue is then separated by filtration from the liquid, is washed with anhydrous ethanol, and is finally dried in a vacuum desiccator. The resulting compound contains 67 percent, by weight, of riboflavin and melts at above 150° C. with decomposition. After cooling the molten reaction product to room temperature, it becomes a hard, dark product which is dissolved in water to a volume of 50 cc. The solution is transparent and of dark red color; its pH is about 4.0.

This compound has been compared with the compound obtained without melting at the reaction temperature of 70° C. The addition of alkalis lowers the melting temperature of the initial reaction product.

EXAMPLE 2

| | | |
|---|---|---|
| 600 | g. | of paraformaldehyde, containing 95% of formaldehyde, |
| 250 | g. | of riboflavin, |
| 8 | g. | of magnesium sulfate, |
| 1 | g. | of ferrous sulfate, |
| 10 | g. | of calcium lactate |
| 0.5 | g. | of manganese dioxide, and |
| 25 | g. | of citric acid | are thoroughly mixed. The powerful odor of the paraformaldehyde almost disappears on mixing. Hot water is then added to yield a total volume of 1,500 cc. The resulting pasty mixture is kept at a temperature of about −20° C. for 12 hours. The mixture is then exposed to ultraviolet irradiation and heated at the rate of 2° C. per minute. After about 45 minutes the mixture boils and melts at a temperature of about 100° C. Melting is continued for 15 more minutes until gas generation sets in. At that moment heating is discontinued. After cooling to room temperature a black, hard, partially carbonized product interspersed with crystals is obtained. The crystals are freely soluble in water but the carbonized material which is present in about 10 percent of the total weight of the reaction product, is insoluble in water and is separated by filtration or centrifuging. The resulting aqueous solution has a pH below 3.0 and is capable of reducing metal oxides to the respective metals. The reaction product is the result of the combination of different polymers of formaldehyde with different polymers of riboflavin or ribose. The biological activity of the reaction product obtained as described hereinabove by melting is increased by 25 percent over that obtained below the melting point.

EXAMPLE 3

This example corresponds to the foregoing example 2. Thereby, however, 250 g. of riboflavin are replaced by 100 g. of ribose. The reaction is carried out as described in example 2. The reaction product obtained on heating and melting exhibits a therapeutic effectiveness similar to that of the product of example 2.

EXAMPLE 4

600 g. of 95% paraformaldehyde,
250 g. of riboflavin or 100 g. of ribose, and
25 g. of nicotinic acid amide or vitamin PP are mixed. Water is added to the mixture to yield a volume of 1,500 cc. The resulting pasty mixture is kept at a temperature of about −20° C. For 12 hours. The reaction mixture is then heated 2 more minutes until it is molten and is kept at room temperature for a few days in an open container in order to evaporate volatile odorous compounds. It is dissolved in water or is pulverized for therapeutic use. The therapeutic effectiveness of this product is about 25 percent higher than than that of a product obtained according to examples 2 or 3.

EXAMPLE 5

This example is a modification of the previous examples by changing the composition of the reaction medium as follows:

250 g. of riboflavin,
600 g. of paraformaldehyde, containing about 95% formaldehyde,
10 g. of adenine,
2 g. of vitamin $B_6$,
16 g. of magnesium perchlorate, anhydrous,
10 g. of calcium lactate,
1 g. of potassium permanganate,
1 g. of ferrous sulfate,
1 g. of manganese dioxide,
50 g. of lactic acid.

The mixture is thoroughly mixed. The powerful odor of the paraformaldehyde almost disappears due to the oxidation of the formaldehyde by manganese dioxide. 1,500 cc. of hot water of 50° C. is then added. The total weight is 2,439 g. The resulting pasty material which is of coffee color is kept at a temperature of −20° C. for 12 hours to cause polymerization of formaldehyde. The mixture melts at that temperature. The mixture is exposed to ultraviolet irradiation to activate the polymerization reaction for 12 hours. The material is then heated on an electric plate in a fume hood for two hours. The reaction medium starts to boil at a temperature of about 80° C. after 20 minutes of heating and assumes chocolate color. At a temperature of above 100° C. the reaction medium melts after complete evaporation of water. After 2 hours of heating the temperature of the reaction medium reaches 110° C. After cooling at room temperature a resinous dark and hard material is obtained. Its weight is 675 g.

The reaction product obtained by such a first heating reaction is dissolved in 1,000 cc. of water. The solution is kept at a temperature of −20° C. for 6 hours. The solution does not freeze at that temperature. The solution is then activated by irradiation with ultraviolet light for 12 hours. It is then heated to a temperature of 100° C. within 20 minutes, after 1 hour of heating the solution becomes a transparent liquid which successively darkens due to oxidation by air. After 1 hour and 20 minutes the temperature of the reaction medium reaches 116° C. and the elimination of fumes is observed. Heating is interrupted. After cooling a hard dark resinous material of 575 g. is obtained. No odor of formaldehyde can be perceived.

Third heating step of the reaction medium: The reaction product of the former two heating steps is treated in the same manner, i.e., cooling to −20° C. and exposure to ultraviolet irradiation for 12 hours. It is then dissolved in 950 cc. of water and 50 cc. of lactic acid. The color of the solution becomes green. The solution is heated and attains the temperature of 100° C. after 17 minutes. After one hour and ten minutes the water of the solution is completely evaporated and the molten material of a temperature of 108° C. starts to burn. Heating is stopped. After cooling to room temperature the hard resinous reaction product weighs 475 g. and is of brown color. Its density is 1.3, its pH about 2.5. The reaction product is dissolved in water to a volume of 2,500 cc. Only 200 g. of the reaction product are readily soluble in water. 275 g. of the material consist of a residue containing riboflavin which is not soluble in cold water. One cc. of the diluted reaction product contains about 100 units.

EXAMPLE 6

This example represents a modification of the reaction medium by substitution of riboflavin by ribose and by a different method of production of synthetic sugars from formaldehyde which combine by fusion with ribose. The reaction mixture of this example is composed of the same components as that of example 5. However, instead of 250 g. of riboflavin 100 g. of ribose are used. The reaction mixture without ribose is suspended in 1,000 cc. of water of a temperature of 50° C. and is stirred. The mixture assumes the color of milk coffee. The diluted reaction mixture is kept at a temperature of −20° C. for 4 hours in order to complete polymerization and is then exposed to ultraviolet irradiation for 12 hours. The solution melts at that temperature. The reaction medium is heated and it starts to boil and melt after 15 minutes at a temperature of 100° C. This temperature remains the same within 1 hour and 30 minutes with different changes in consistency and color. After 110 minutes of heating the reaction medium becomes darker at a temperature of 105° C. At a temperature of about 120° C. the reaction medium forms an explosive mixture with air and it causes spontaneous burning with flame formation. Heating is then stopped and the flame extinguished by closing the recipient. After cooling at room temperature a hard greyish material is obtained which is not soluble in water. This material contains, as it is assumed, the synthetic sugars. In order to combine by fusion these sugars with ribose the following procedure is used: 100 g. of ribose, 950 cc. of water, and 50 cc. of lactic acid are mixed with the greyish insoluble material. The mixture is exposed to ultraviolet irradiation for 12 hours at a temperature of −20° C. for 4 hours. The mixture is then heated to boiling at 100° C. for 1 hour. The greyish material dissolves completely. On cooling at room temperature the final reaction product is a syrupy liquid of yellow color. The reaction product is dissolved in water in an amount sufficient to yield a volume of 2,500 cc.

EXAMPLE 7

This example represents a process of addition polymerization by adding hydrogen peroxide to the reaction medium. Other oxidants, e.g. sodium hydroxide, may also be used. Reaction of the reaction medium containing hydrogen peroxide causes completion of the chain reaction of the reaction components. The end products of the reaction are completely soluble in water without any residue, thus increasing therapeutic effectiveness, as compared to the reaction products of the former examples.

The process of producing of the reaction products according to this example is analogous to that of the former examples. The difference consists only in the addition of hydrogen peroxide and twice the amount, by weight, of the oxidants, i.e., potassium permanganate, manganese dioxide and ferrous sulfate which are reduced by the hydrogen peroxide.

The reaction is carried out as follows: The reaction mixture, prepared for the first polymerization step is composed of 250 g. of riboflavin,
10 g. of adenine,
2 g. of vitamin $B_6$,
16 g. of magnesium perchlorate,
600 g. of paraformaldehyde, 95%,
2 g. of potassium permanganate,
2 g. of manganese dioxide,
2 g. of ferrous sulfate.

1,500 ml. of water are added to this mixture. The reaction mixture becomes of syrupy consistence and assumes an orange color.

The mixture is exposed to ultraviolet irradiation for 12 hours, then kept frozen at a temperature of −20° C. for 6 hours.

The reaction medium is then heated. It boils at 100° C. after 45 minutes of heating and it reaches a temperature of close to 120° C. after 80 minutes. Heating is then stopped. The reaction product is a hard, dark brown resin of acidic reaction to litmus.

To the resin there is added:

50 ml. of hydrogen peroxide, 50%,
950 cc. of water
   = 1000 cc. of a 2.5% hydrogen peroxide solution,
10 g. of calcium lactate.

The reaction mixture evolves spontaneously heat of about 50° C. for about 8 hours. After cooling to about 20° C., the reaction mixture is exposed to ultraviolet irradiation for 12 hours and then kept in a frozen condition at a temperature of −20° C. for about 6 hours.

The reaction mixture is then heated to a temperature of 300° C. within 65 minutes. It boils at a temperature of 99° C. On cooling, a black, soft, resinous material is obtained which weighs 500 g. No odor of formaldehyde is percepted. To the resulting reaction mixture there are added 25 ml. of lactic acid, and
475 ml. of water, and
25 g. of citric acid.

The reaction mixture is almost completely dissolved in 500 cc. of the 5 percent solution of lactic acid. Citric acid facilitates formation of methylene ethers. The reaction mixture is kept at a temperature of −20° C. for 6 hours and does not solidify.

The reaction mixture is then heated to a temperature of 260° C. for 30 minutes. The boiling point of the reaction mixture is 140° C. It is observed that the 5 percent lactic acid solution combines at once with the reaction mixture and increases the solubility of the final reaction product. On cooling to room temperature, a final, hard, greenish-dark reaction product is obtained. No odor of formaldehyde can be detected. The final weight of the reaction product is 625 g. The reaction product is suspended in 2,500 cc. of distilled water. The solution is of dark greenish color and acidic to litmus. On shaking with air it forms bubbles throughout the solution with evalution of a gas which air carries away. Formation of active principles, i.e., a transfer of new radicals, formed during the polymerization process, continues to build up new molecules of the reaction product for about 6 months.

The reaction product suspended in water is fractionally filtered through filter paper. The residue of the first filtration is dissolved in 500 ml. of hot water and it contains the same concentration as the original solution. The solubility of the residue decreases with the number of filtrations since the solubility of the components of the reaction product varies according to the content of riboflavin. Thus, the components of the reaction product may be separated by fractional filtrations and studied by chromatography. The average rate of solubility is about 1 g. of the solution per 16 ml. of hot water. The volume of the final solution amounts to 12,500 ml. One ml. of the solution contains 100 units of the reaction product. The transparent liquid reaction product is of different colors at different concentrations, varying from dark cherry to orange to green. Its pH is 3.52, its density 1.12.

The reaction product prepared according to this example has been compared with that of Example 5, the latter having been dissolved in 2,500 cc. of water and containing 100 units per cc. The concentration of the active reaction product produced according to the present Example 7 contains 5-times more of the reaction product than that of Example 5.

The determination of the concentration of the reaction products was made by spectrophotometry.

The therapeutic standard unit used in administering the reaction products according to this invention depends on the amounts of riboflavin and/or ribose used in the reaction. While both are desirable in most cases, it has been found that a simple relation between their molecular weight serves as a means of measurement. Thus the ribityl group of riboflavin may be considered as equal to one mole of ribose.

The molecular weight of riboflavin is 376 — almost exactly 2.5 times that of ribose. Thus, to put on equivalent total ribose basis, the weight of ribose used would be multiplied by 2.5 and added to the weight of riboflavin used. A batch of each reaction product containing ribose, riboflavin, or both, may be said to contain as many conventional units as are calculated by means of the following formula:

Amount in mg. of Paraformaldehyde + riboflavin + 2.5 ribose/4

= number of units.

Thus the amount of units of the batch according to example 5 of U.S. Pat. No. 3,479,335 is, for instance:

750,000 mg. paraformaldehyde + 250,000 mg. riboflavin/4

= 250,000 units.

The reaction products with riboflavin, according to this invention, belong to the group of nucleic acid compounds called ribonucleosides. It has been found that these reaction products enter the blood stream and penetrate into the malignant cells apparently within a few minutes. The normal cells, however, apparently do not absorb these preparations.

Acute chronic toxicity tests have been performed with said preparations. Neither toxicity nor side-effects, nor contra-indication, have been observed. A very large dose — 10 times the amount of a high therapeutic dose, has proved to be harmless.

Before starting the treatment, it is, of course, advisable to have the following laboratory tests available: Microscopic examination, blood count, sedimentation rate, size of tumor, temperature curve, weight, and other data.

PHARMACOLOGICAL TESTS

Pharmacological tests with the new preparations according to the present invention were carried out as follows:

Tests on animals

Preliminary tests were performed mainly on spontaneously afflicted cancer animals with the purpose of determining the effectiveness of the preparation. The criteria of effectiveness were based on the three characteristic features of cancer growth: weight, survival time, and regression of tumors.

Chicken Myelocytomatosis:

210 chickens afflicted with this form of avian leukosis complex associated with tumor formation were treated with the preparation made according to example 5 of U.S. Pat. No. 3,479,335. The intramuscular injections equivalent to 12.5 to 25 units present in the original reaction mixture of said example 5, were given at intervals of 24 hours. After 1 week, complete regression of the tumos was observed in 156 chickens, i.e., in 75 percent of the treated animals.

Cancer in Dogs:

68 Dogs afflicted with different types of malignant growths were treated with the preparation according to said example 5. Biopsy was performed in 32 dogs. In the other dogs, the diagnosis was made on the basis of clinical symptoms. 24 Animals carried a primary tumor, 44 were found with disseminated cancer. All animals were treated with an amount of the preparation equivalent to 50 to 500 units. As a result of this treatment, 22 dogs with primary tumors showed an increase in weight and the tumors regressed. After 1 year, about 50 percent of the treated animals had survived, and were found normal and without symptoms of cancer.

46 of said dogs with advanced cancer manifested also an improvement evidenced by partial regression of the tumors, increase in appetite and weight, and in prolongation of life; but they died within six months.

Spontaneous Adenocarcinoma:

64 mice, $C_3H$ occasionally found to have cancer growths, were treated with a dose of 0.25 to 0.60 units at intervals of 24 hours. 26 mice of this group with a primary single tumor of a diameter of 5 mm. or less responded to the treatment. Complete and stable regression of the tumors was observed within 3 months. The other 38 mice did not fully respond to this dosage. However, life prolongation for 2 to 4 weeks, partial regression of the tumors, and temporary increase in weight were observed.

Rous Sarcoma:

A group of 20 young chickens were infected with virus and carcinogenic materials of Rous Sarcoma and divided in four groups of five chickens each. Three groups were treated with the preparation as produced in said example 5 in doses of 20 to 60 units. The fourth group was left untreated as a control group. The treated chickens survived the control group by 2 to 3 weeks. The death of the treated groups was caused by hemorrhagic tumors which developed from the viral infection. Ascites, a further characteristic of Rous sarcoma, was absent in the treated animals. The control group developed both hemorrhagic tumors and ascites. The ascites result from carcinogenic material. Thus the test shows that the preparation of this invention prevented the occurrence of carcinogenic ascites in the treated chickens.

Sarcoma 180:

The tests performed on Sarcoma show insufficient effectiveness of the preparations according to this invention. According to these tests, six Swiss mice were implanted subcutaneously in the axillary region with Sarcoma 180 and six mice were left as control group. The treatment began 24 hours after implantation. Doses of 20 to 30 mg. of riboflavin in the original reaction mixture were given daily for 7 days. All animals were sacrificed on the eighth day. The weight of the tumors of the test animals was 1,434 mg., as compared with those of the control animals which was 1,781 mg. The results thus show a reduction in tumor weight in the treated animals by 20 percent over that of the controls. All treated animals survived the test.

The recent studies on many systems of implanted tumors in mice and rats have been performed in different laboratories at different dosage levels of the reaction products. It results from these tests that the reaction products exert no curative effectiveness on the implanted growth of tumors.

Preliminary tests submitted by a University laboratory show that the reaction products increase the survival time of mice irradiated throughout the body with 650 rads (50 percent lethal dose). The results are as follows:

|    |                          | animals | survivals | in percent |
|----|--------------------------|---------|-----------|------------|
| a) | X-ray alone of 650 rads  | 62      | 38        | 57         |
| b) | drug alone 0.4 units     | 56      | 55        | 98         |
| c) | drug 0.2 units + X-rays  | 22      | 19        | 86         |
| d) | X-rays + drug 0.2 units  | 32      | 25        | 78         |

The treated animals had not developed radiation syndromes. The survival rates refer to 30 days.

I claim:

1. The reaction product obtained by polycondensation and polymerization of the reaction mixture composed of an aqueous solution of formaldehyde, a pentose compound selected from the group consisting of ribose and riboflavin, an inorganic salt, and a compound containing an amino group.

2. In a process of producing the reaction product of claim 1, wherein the reaction product is irradiated with ultraviolet light, cooled at a temperature of about $-20°$ C., and heated to a temperature of $300°$ C.

3. The reaction product resulting from the fusion of polymerized formaldehyde with a polymerized pentose selected from the group consisting of ribose and riboflavin, said fused reaction product containing at least two methylene groups in its molecule joined by oxygen linkage.

4. In a process of producing the reaction products of claim 2 by polymerization under the influence of heat and light in the presence of a peroxide catalyst with free photochemical dissociation of the catalyst.

* * * * *